(12) United States Patent
Hong et al.

(10) Patent No.: US 7,489,505 B2
(45) Date of Patent: Feb. 10, 2009

(54) EXTERNAL HARD DISK ENCLOSURE

(75) Inventors: Lin-Yun Hong, Shenzhen (CN);
Hsuan-Chen Chen, Taipei Hsien (TW);
Chien-Li Tsai, Taipei Hsien (TW);
Chun-Chi Liang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 201 days.

(21) Appl. No.: 11/565,634

(22) Filed: Dec. 1, 2006

(65) Prior Publication Data

US 2007/0133166 A1 Jun. 14, 2007

(51) Int. Cl.
*G06F 1/16* (2006.01)
(52) U.S. Cl. .................................. 361/685; 206/307
(58) Field of Classification Search ............. 361/685; 206/307
See application file for complete search history.

(56) References Cited

U.S. PATENT DOCUMENTS 5,187,643 A * 2/1993 I-Shou ..................... 361/685
5,216,582 A * 6/1993 Russell et al. ............. 361/685
5,406,450 A * 4/1995 Shieh ...................... 361/686
6,231,145 B1 * 5/2001 Liu ......................... 361/685
6,272,011 B1 * 8/2001 Chen ....................... 361/685
6,891,721 B2 * 5/2005 Huang ..................... 361/685
7,120,014 B2 * 10/2006 Yang ....................... 361/685
7,269,003 B1 * 9/2007 Chung ..................... 361/685
7,405,928 B2 * 7/2008 Robertson et al. ......... 361/685
7,414,838 B2 * 8/2008 Yeh ......................... 361/688
2007/0187267 A1 * 8/2007 Hong et al. ............... 206/307

* cited by examiner

*Primary Examiner*—Lisa Lea-Edmonds
(74) *Attorney, Agent, or Firm*—Wei Te Chung

(57) ABSTRACT

A hard disk enclosure includes a tray, a cover engaging with the tray, and a case. The tray includes a bezel and a bottom plate. The bottom plate includes a plurality of retainers extending therefrom. The retainers cooperate to form between a space for receiving a hard disk. Each of the retainers forms a protrusion for engaging with the hard disk. The cover includes a rear wall, and an insert wall extending from a side of the rear wall. The case accommodates the bottom plate of the tray and the insert wall of the cover, and is retained between the bezel of the tray and the rear wall of the cover.

18 Claims, 6 Drawing Sheets

EXTERNAL HARD DISK ENCLOSURE

CROSS-REFERENCES TO RELATED APPLICATION

The present invention is related to a co-pending application of U.S. Ser. No. 11/309,861, filed on Oct. 16, 2006, entitled with "MOBILE HARD DISK BOX", and assigned to the same assignee.

BACKGROUND OF THE INVENTION

1. Field of the Invention

The present invention relates to external hard disk enclosures, and particularly to an external hard disk enclosure which readily allows installation or removal of a hard disk thereto or therefrom.

2. Description of Related Art

In modern life, a mass of data needs to be transmitted between two electronic devices, such as computers or other data controlling devices. An external hard disk is generally used for completing the task. The hard disk is accommodated in an enclosure to prevent the hard disk from being damaged. A connector of a data wire connects with the hard disk enclosure for transmitting data between the hard disk and one of the electronic devices. A typical external hard disk enclosure includes several parts assembled by screws.

As shown in FIGS. 5 and 6, an external hard disk enclosure is disclosed. The hard disk enclosure includes a tray 920, a cover 960, and a case 950. A hard disk 980 is received in the hard disk enclosure. The tray 920 includes a bezel 922, and a bottom plate 924. Four through-holes 926 and a mounting hole 928 are defined in the bottom plate 924. The cover 960 includes insert walls 962 extending forward from sides thereof. A fixing tab 964 extends forward from the cover 960. A through hole 966 is defined in the fixing tab 964 corresponding to the mounting hole 928 of the tray 920. The case 950 defines a round hole in a bottom wall thereof, corresponding to the through hole 966 of the cover 960 and the fixing hole 928 of the tray 920. The hard disk 980 forms four mounting tabs on a bottom wall thereof. Each mounting tab defines a threaded hole (not shown) therein. In assembling, four screws 970 are inserted through the corresponding through-holes 926 of the tray 920 and engage in the corresponding threaded holes of the hard disk 980. Thus, the hard disk 980 is mounted to the tray 920. The bottom plate 924 of the tray 920 with the hard disk 980 is accommodated in the case 950. The insert wall 962 and the fixing tab 964 are inserted into the case 950. A screw 930 is inserted through the round hole of the case 950, and the through hole 966 of the cover 960, and engages in the mounting hole 928 of the tray 920. Thus, the cover 960 is mounted to the tray 920. However, this way of installing the hard disk 980 uses so many screws, which is unduly painstaking and time-consuming.

What is desired, therefore, is an external hard disk enclosure which readily allows easy installation or removal of a hard disk thereto or therefrom.

SUMMARY OF THE INVENTION

An exemplary hard disk enclosure includes a tray, a cover engaging with the tray, and a case. The tray includes a bezel and a bottom plate. The bottom plate includes a plurality of retainers extending therefrom. The retainers cooperate to form between a space for receiving a hard disk. Each of the retainers forms a protrusion for engaging with the hard disk. The cover includes a rear wall, and an insert wall extending from a side of the rear wall. The case accommodates the bottom plate of the tray and the insert wall of the cover, and is retained between the bezel of the tray and the rear wall of the cover.

Other advantages and novel features will become more apparent from the following detailed description when taken in conjunction with the accompanying drawings, in which:

DETAILED DESCRIPTION OF THE INVENTION

Figure 1:
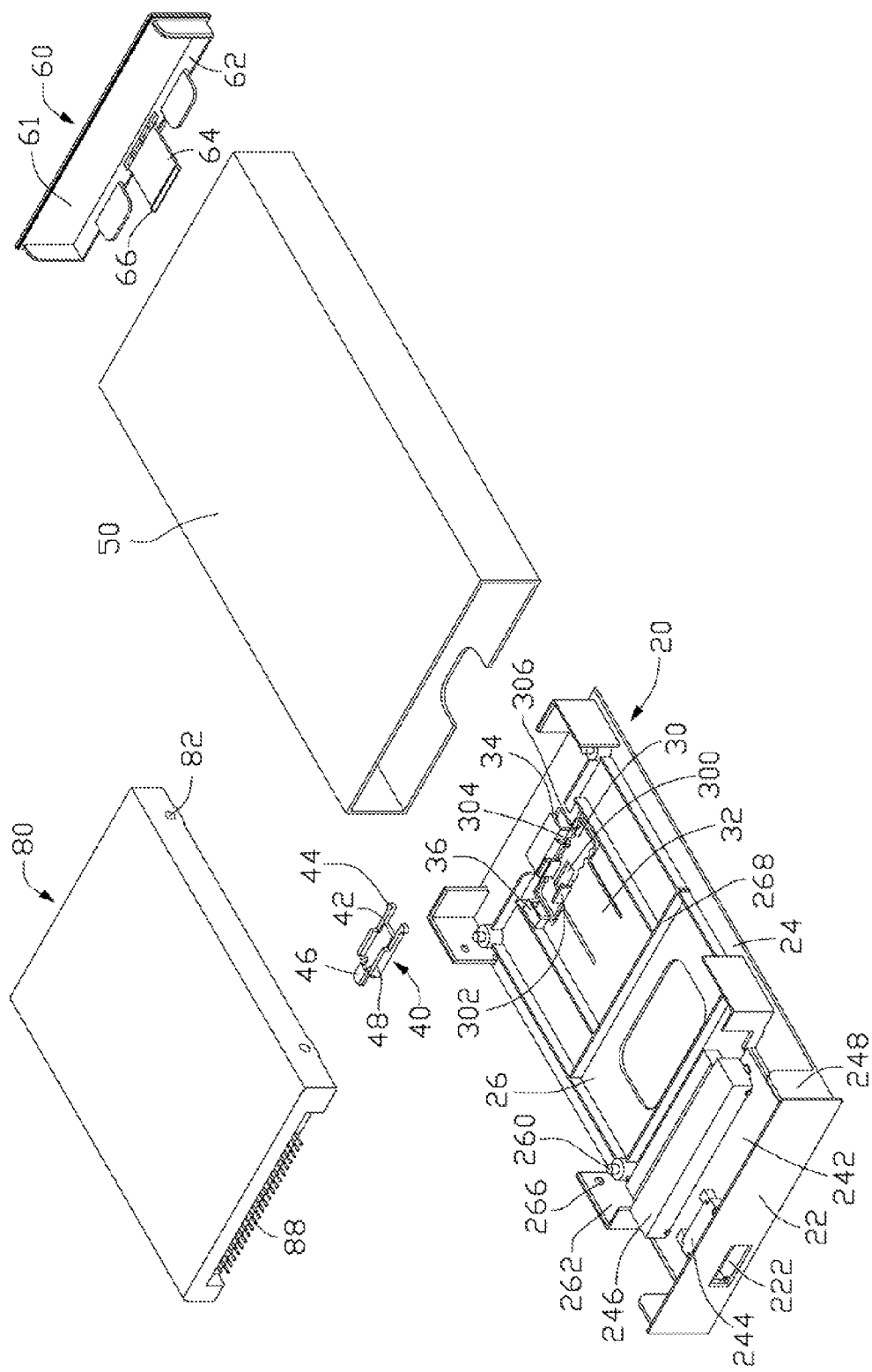
FIG. 1 is an exploded, isometric view of an external hard disk enclosure in accordance with a preferred embodiment of the present invention, together with a hard disk.
Figure 2:
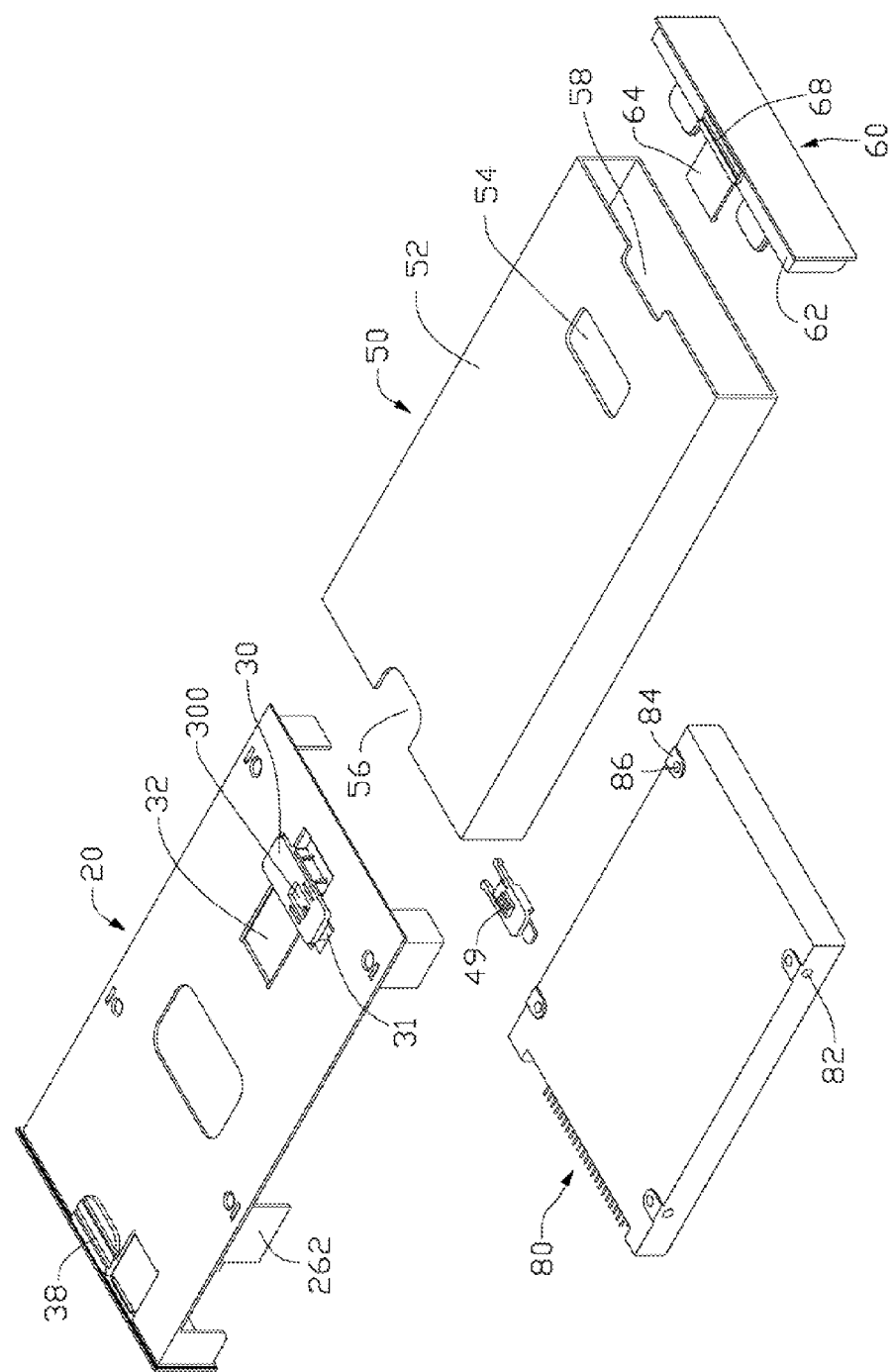
FIG. 2 is an inverted view of FIG. 1.

Referring to FIGS. 1 and 2, an external hard disk enclosure in accordance with a preferred embodiment of the present invention includes a tray 20, an operating member 40, a case 50, and a cover 60. The hard disk enclosure is used for receiving a hard disk 80. The hard disk 80 defines two receiving holes 82 in each side wall thereof. Four mounting tabs 84 are formed on four corners of a bottom wall of the hard disk 80. Each mounting tab 84 defines a through hole 86 therein. The hard disk 80 includes a male connector 88 at an end thereof.

The tray 20 includes a bezel 22, and a bottom plate 24 perpendicularly extending from a bottom of the bezel 22. A slot 222 is defined in the bezel 22 to provide an access for an external connector on an end of a data wire (not shown) passing therethrough. The other end of the data wire can be connected to an electronic device, such as a notebook computer. An opposite end of the data wire can be connect with an electronic device, such as a computer, for transmitting data between the hard disk and the electronic device. A motherboard 242 is mounted on the bottom plate 24 adjacent the bezel 22. The motherboard 242 includes a connector 244 aligning with the slot 222 for connecting with the external connector, and a female connector 246 configured for connecting to the male connector 88 of the hard disk 80. Two insert walls 248 connecting with corresponding ends of the bezel 22 perpendicularly extend up from corresponding sides of the bottom plate 24. Four L-shaped retainers 262 perpendicularly extend from the bottom plate 24. The retainers 262 are arranged on four corners of a supposed rectangle respectively and facing each other. A protrusion 266 protrudes from an internal side of each retainer 262. Four positioning posts 260 extend up from the bottom plate 24, adjacent the corresponding retainers 262. A plurality of supporting ribs 268 is formed on the bottom plate 24, for supporting the hard disk 80. A locking portion 30 is received in and exposed from an opening 31 defined in a rear end of the bottom plate 24. A resilient connecting arm 32 extends from the bottom plate 24, for connecting the locking portion 30 and the bottom plate 24. The locking portion 30 defines a groove 300 therein. Two claws 302 extend up from opposite sides of the locking portion 30. Each side of the locking portion 30 defines a first notch 304 and a second notch 306 in an inner surface thereof.

A catch 34 extends from one of the sides of the locking portion 30. A receiving portion 36 is formed on the bottom plate 24, adjacent an end of the opening 31. A pulling portion 38 is formed on an outer surface of the bottom plate 24, adjacent the bezel 22.

The operating member 40 includes a pair of resilient rods 42 extending from an end thereof. Each rod 42 forms a latch 44 on a free end thereof. A block 46 protrudes from an opposite end of the operating member 40, corresponding to the receiving portion 36 of the tray 20. Two projecting portions 48 extend up from two opposite sides of the operating member 40 respectively. An operating section 49 is formed on an outer surface of the operating member 40, corresponding to the groove 300 of the bottom plate 24. A length of the operating section 49 is shorter than that of the groove 300.

The case 50 has a bottom wall 52, a top wall opposite to the bottom wall 52, and two side walls connecting corresponding ends of the bottom wall 52 and the top wall. The bottom wall 52, the top wall, and the side walls together define a receiving space. An opening 54 is defined in the bottom wall 52, for receiving the locking portion 30 of the tray 20. A first cutout 56 and a second cutout 58 are defined in opposite ends of the bottom wall 52. The first cutout 56 corresponds to the pulling portion 38 of the tray 20.

The cover 60 includes a rear wall 61 and insert walls 62 extending forward from corresponding sides of the rear wall 61. A resilient arm 64 extends forward from a middle of a bottom of the rear wall 61. A hook 66 is formed on a free end of the resilient arm 64, corresponding to the catch 34 of the tray 20. An operating portion 68 is formed on an outer surface of the insert wall 62, corresponding to the second cutout 58 of the case 50.

Figure 3:
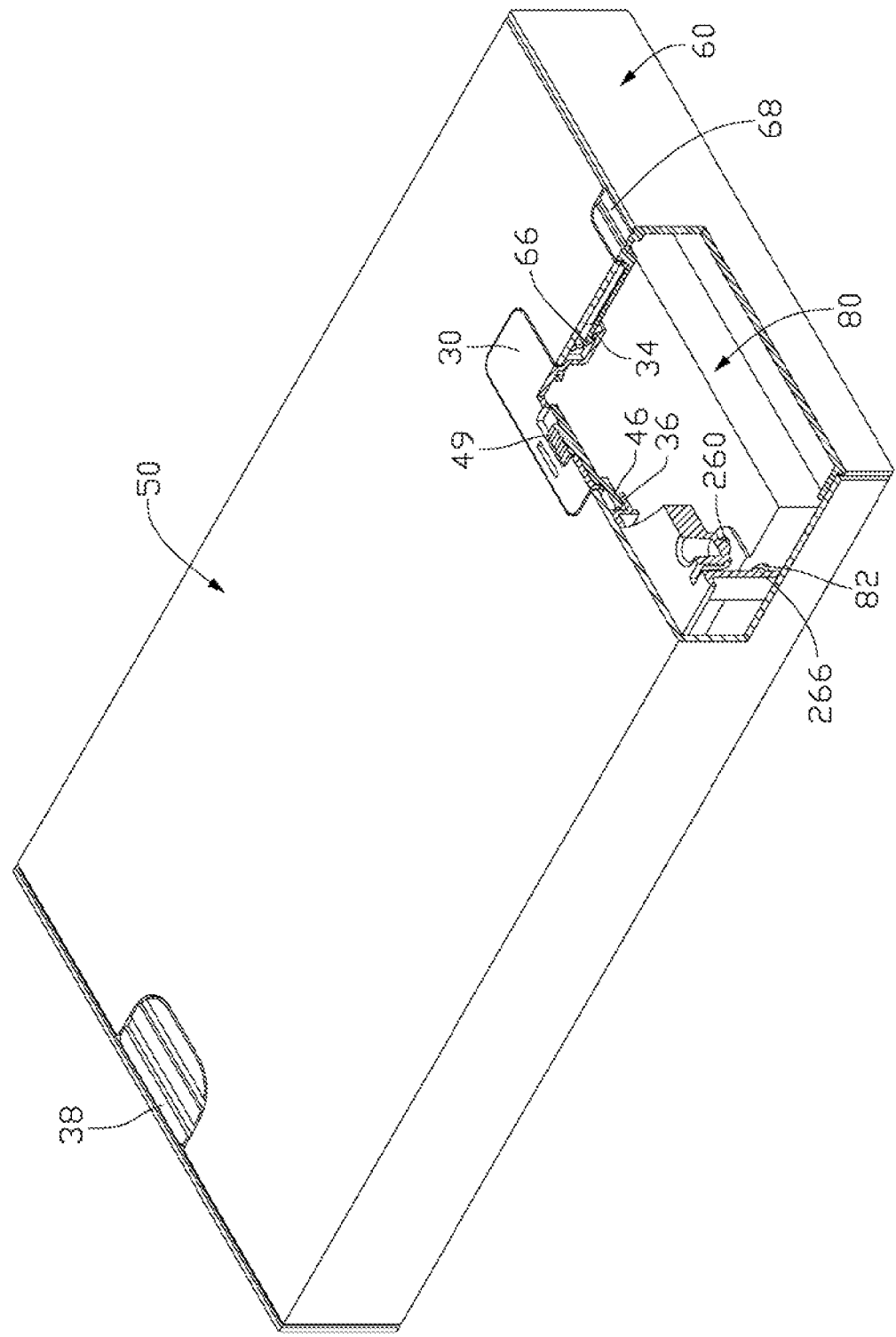
FIG. 3 is an assembled view of FIG. 2, but partially cutaway, and showing the hard disk enclosure in a locked state.
Figure 4:
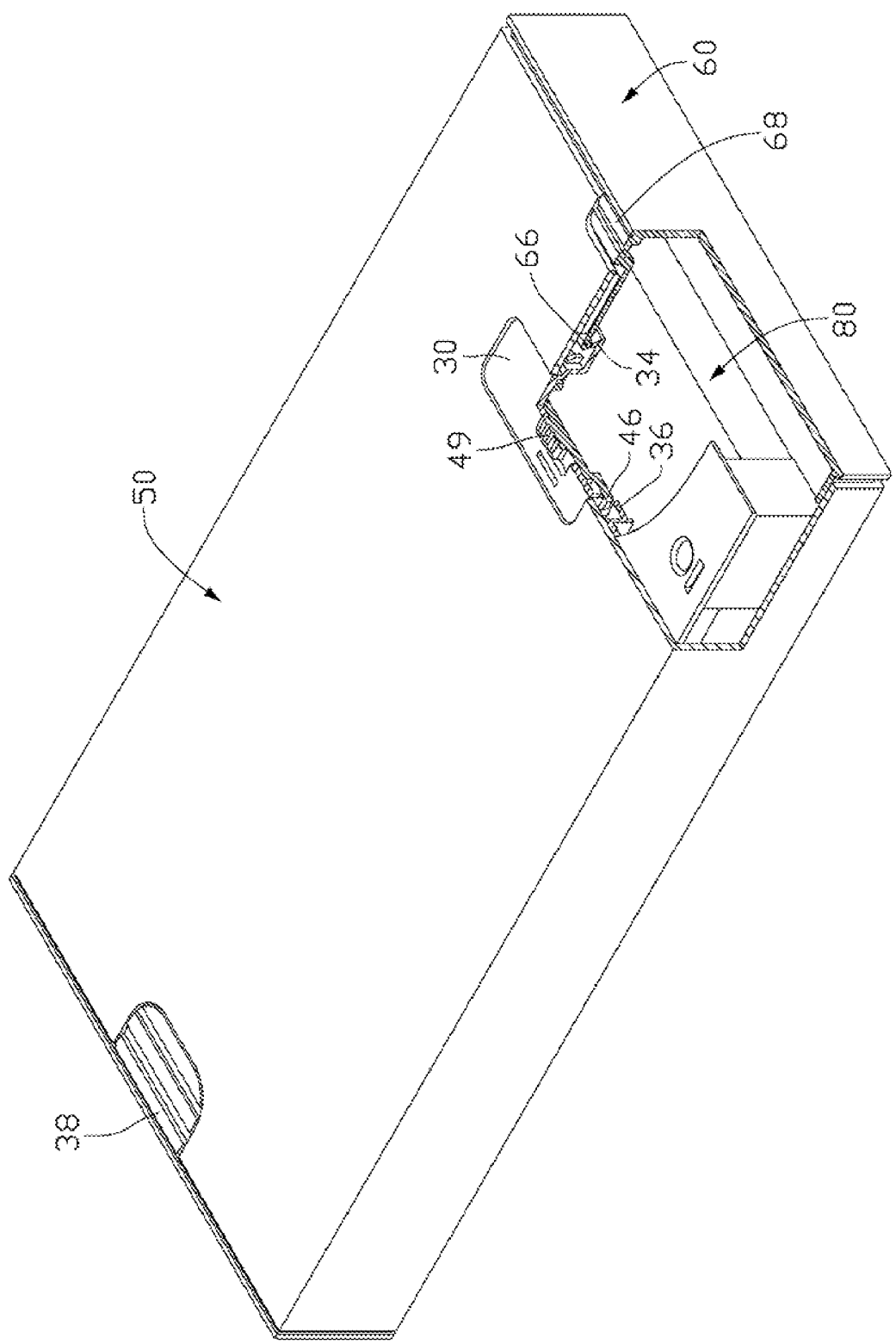
FIG. 4 is similar to FIG. 3, but showing the hard disk enclosure in an unlocked state.
Figure 5:
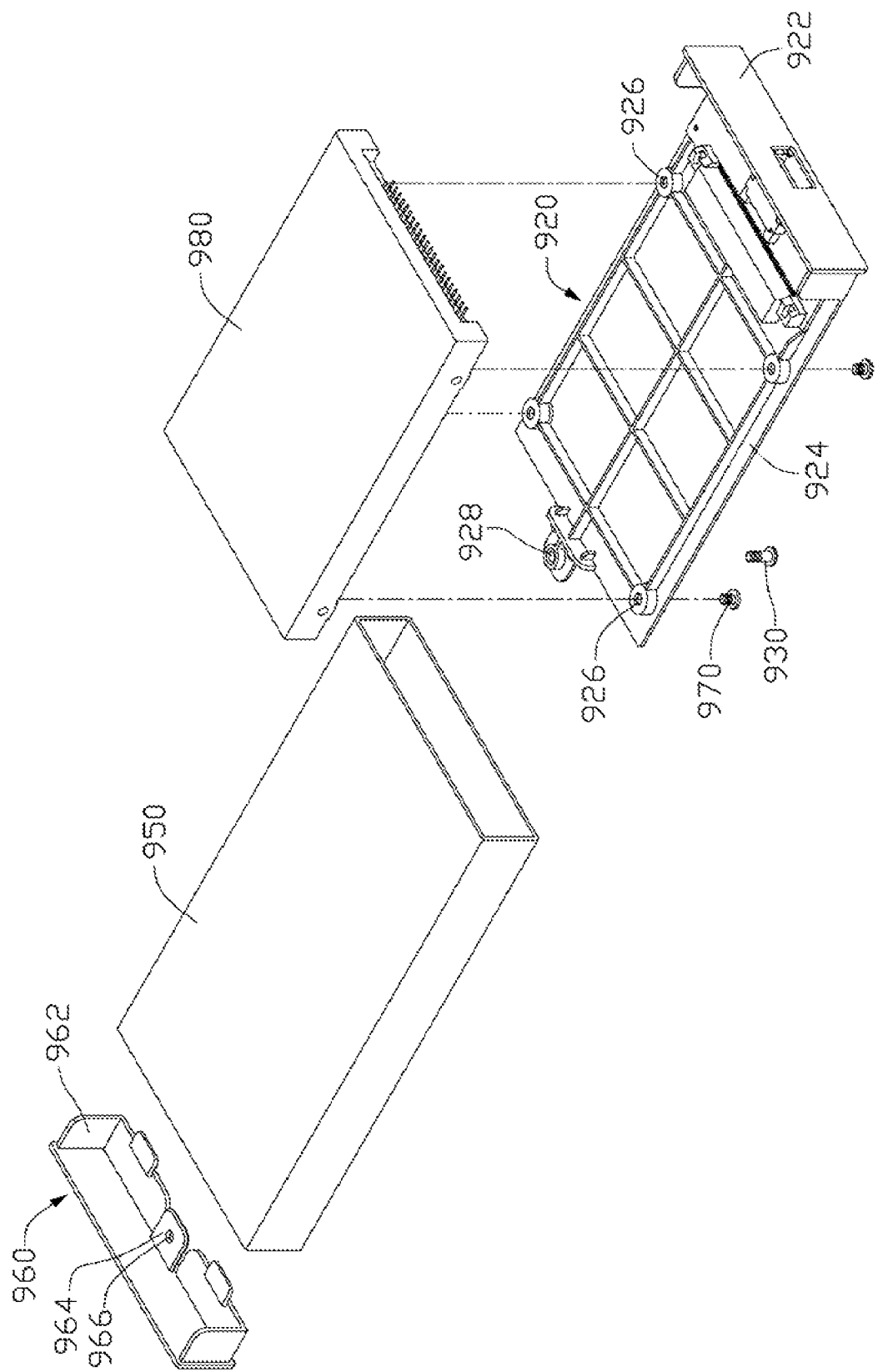
FIG. 5 is an exploded, isometric view of a conventional hard disk enclosure with a hard disk.
Figure 6:
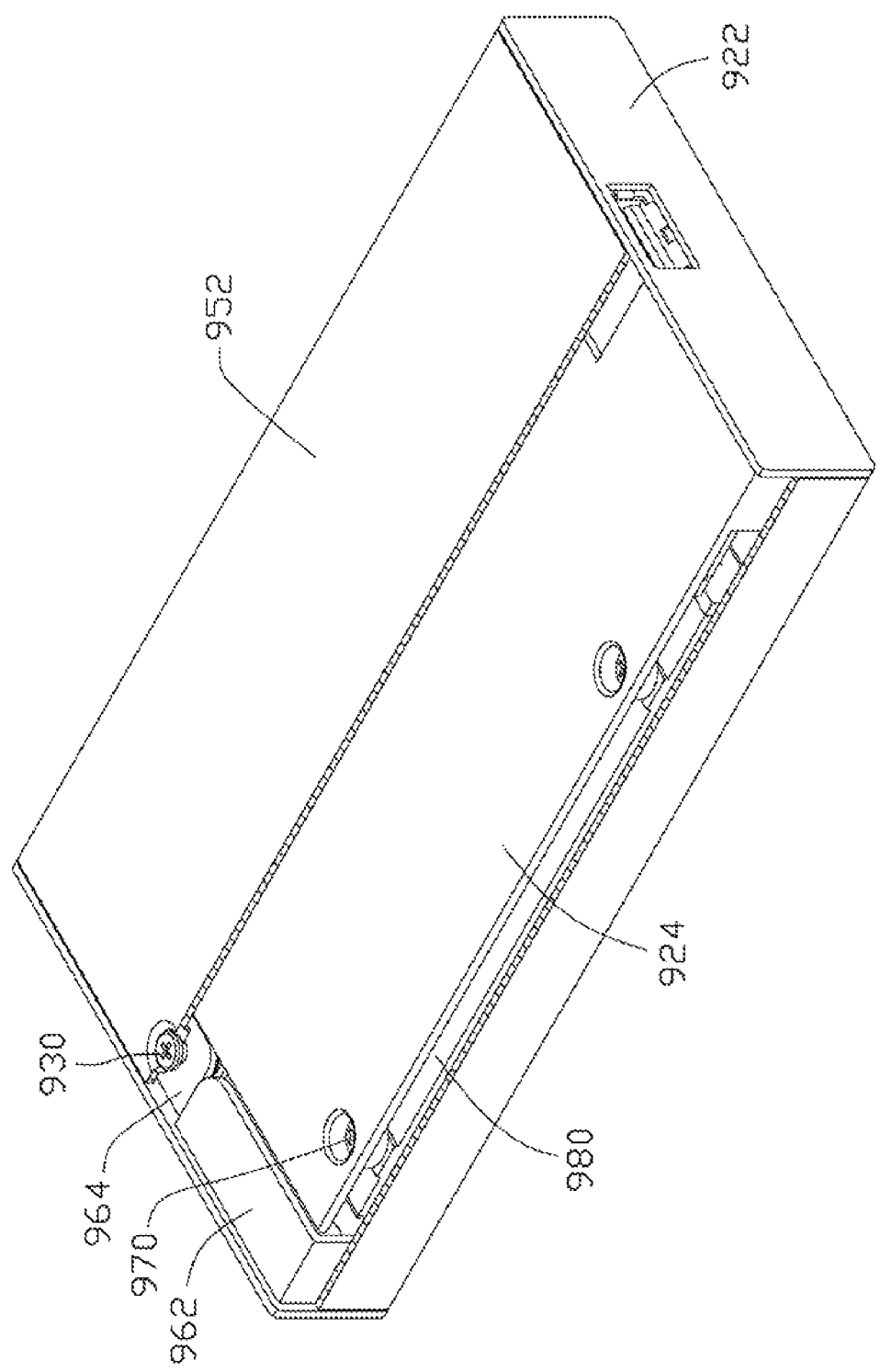
FIG. 6 is an assembled view of FIG. 5, but partially cutaway.

Referring to FIGS. 3 and 4, in assembling the hard disk enclosure and the hard disk 80, the projecting portions 48 of the operating member 40 are received by the claws 302 of the locking portion 30 of the tray 20. The latches 44 of the operating member 40 are received in the corresponding second notches 306. The operating section 49 of the operating member 40 is received in the groove 300 of the locking portion 30. Thus, the operating member 40 is slidably assembled to the locking portion 30 of the tray 20, in an unlocked position. The hard disk 80 is then received in a space formed by the retainers 262 of the tray 20. The male connector 88 of the hard disk 80 is connected to the female connector 246 of the motherboard 242. The supporting ribs 268 of the tray 20 support the hard disk 80. The positioning posts 260 of the tray 20 are inserted into the corresponding through holes 86 of the hard disk 80. The retainers 262 abut against the corresponding side walls of the hard disk 80. The protrusions 266 of the retainers 262 are received in the corresponding receiving holes 82 of the hard disk 80. Thus, the hard disk 80 is mounted to the tray 20. The bottom plate 24 of the tray 20 with the hard disk 80 is accommodated in the case 50. The bezel 22 abuts against an end of the case 50. The pulling portion 38 of the tray 20 is received in the first cutout 56 of the case 50. The locking portion 30 of the tray 20 is received in the opening 54 of the case 50. The insert wall 62 of the cover 60 is inserted into the case 50, and the rear wall 61 of the cover 60 abuts against an opposite end of the case 50. The resilient arm 64 of the cover 60 extends into the case 56 and the hook 66 of the resilient arm 64 catches the catch 34 of the locking portion 30. Thus, the cover 60 is secured to the tray 20. The case 50 is retained between the bezel 22 of the tray 20 and the rear wall 61 of the cover 60. The operating portion 68 of the cover 60 is received in the second cutout 58 of the case 50. The operating section 49 is pushed to slide the operating member 40. The block 46 is received in the receiving portion 36 of the tray 20. The latches 44 are received in the corresponding first notches 304. Thus, the operating member 40 is in a locked position, and the locking portion 30 is kept locked, and cannot be pressed to release the catch 34 from the hook 66 of the cover 60.

In opening the hard disk enclosure, the operating section 49 is pushed to slide the operating member 40 to the unlocked position. The block 46 of the operating member 40 is withdrawn from the receiving portion 36 of the tray 20. The latches 44 are received in the corresponding second notches 306. The locking portion 30 is pressed inward, and the hook 66 of the cover 60 is released from the catch 34 of the locking portion 30. The operating portion 68 is pulled to withdraw the cover 60 from the case 50. The pulling portion 38 is pulled to withdraw the tray 20 from the case 50. When the hard disk 80 is drawn upward, the retainers 262 are distorted, and the protrusions 266 are disengaged from the receiving holes 82 of the hard disk 80. The positioning posts 260 are withdrawn from the through holes 86. Thus, the hard disk 80 is disassembled from the tray 20.

It is believed that the present embodiment and its advantages will be understood from the foregoing description, and it will be apparent that various changes may be made thereto without departing from the spirit and scope of the invention or sacrificing all of its material advantages, the examples hereinbefore described merely being preferred or exemplary embodiment of the invention.

What is claimed is:

1. A hard disk enclosure comprising:
   a tray comprising a bezel and a bottom plate, the bottom plate comprising a plurality of retainers extending therefrom, the retainers cooperating to form between a space for receiving a hard disk, each of the retainers forming a protrusion for engaging with the hard disk;
   a cover engaging with the tray, the cover comprising a rear wall and an insert wall extending from a side of the rear wall; and
   a case accommodating the bottom plate of the tray and the insert wall of the cover, and retained between the bezel of the tray and the rear wall of the cover.

2. The hard disk enclosure as claimed in claim 1, wherein at least one positioning post extends up from the bottom plate of the tray, adjacent the corresponding retainer.

3. The hard disk enclosure as claimed in claim 1, wherein the retainers are arranged on four corners of a supposed rectangle respectively and facing each other.

4. The hard disk enclosure as claimed in claim 3, wherein the retainers are L-shaped.

5. The hard disk enclosure as claimed in claim 3, wherein a plurality of supporting ribs is formed on the bottom plate.

6. A hard disk enclosure comprising:
   a case along a first axis including a pair of casing ends with a receiving space formed between the casing ends, a casing wall formed between the casing ends;
   a tray movably received in the receiving space along the first axis, the tray being configured for mounting a hard disk thereon, the tray comprising four retainers extending therefrom, the retainers being configured for abutting against two corresponding side walls of the hard disk, each of the retainers forming a protrusion, the protrusions being configured for being received in corresponding receiving holes defined in the side walls of the hard disk; and
   a cover mounted at one of the casing ends.

7. The hard disk enclosure as claimed in claim 6, wherein four positioning posts extend up from the tray, adjacent the corresponding retainers, the positioning posts are configured for being inserted into four corresponding through holes defined in four corners of a bottom wall of the hard disk.

8. The hard disk enclosure as claimed in claim 6, wherein the retainers are arranged on four corners of a supposed rectangle respectively and facing each other.

9. The hard disk enclosure as claimed in claim 8, wherein the retainers are L-shaped and each of the retainers is configured for contacting with two of the side walls of the hard disk.

10. The hard disk enclosure as claimed in claim 8, wherein a plurality of supporting ribs is formed on the tray, the supporting ribs is configured for supporting the hard disk.

11. An assembly comprising:
a data storage device having a plurality of sidewalls;
a case along a front-and-rear direction having a pair of opposing open ends with a receiving space formed between the ends, a casing wall formed between the open ends enclosing the receiving space;
a tray for movably mounting the data storage device to the receiving space of the case via one of the open ends, the tray comprising a bottom plate for supporting the data storage device thereon and a bezel extending from the bottom plate for covering said one of the open ends, a plurality of retainers extending from the bottom plate and abutting against the sidewalls of the data storage device to thereby cooperatively hold the data storage device therebetween; and
a cover detachably engaging with the bottom plate and covering the other one of the open ends of the case.

12. The assembly as claimed in claim 11, wherein each of the retainers forms a post inserting into a corresponding receiving holes defined in the side walls of the data storage device to position the data storage device to the tray in an up-and-down direction.

13. The assembly as claimed in claim 12, wherein the data storage device further comprises a bottom wall defining a plurality of holes, and a plurality of positioning posts extend from the bottom plate of the tray in the up-and-down direction and insert into the holes of the data storage device respectively.

14. The assembly as claimed in claim 11, wherein the casing wall of the case defines an opening, the bottom plate of the tray comprises a locking portion exposed to outside of the case via the opening, and the locking portion comprises a catch extending therefrom and engaging with the cover in the front-and-back direction, the locking portion being deformable upon a force in an up-and-down direction exerted thereon to cause the catch to disengage from the cover.

15. The assembly as claimed in claim 14, further comprising an operating member movably attached to an inside of the bottom wall of the tray, wherein the operating member is movable between a locked position where the operating member abuts against the locking portion in a manner so as to prevent inward deformation of the tray locking portion, and an unlocked position allowing inward deformation of the tray locking portion.

16. The assembly as claimed in claim 11, wherein a female connector is installed on the bottom plate of the tray behind the bezel and the data storage device has a male connector matching with the female connector.

17. The assembly as claimed in claim 16, further comprising a motherboard mounted on the bottom plate adjacent the bezel, the femal connector bing mounted on the motherboard.

18. The assembly as claimed in claim 17, wherein an additional connector is mounted on the motherboard, and the bezel defines a slot aligning with the additional connector for providing an acess to a connector of an electronic device to pass therethrough to electrically connect with said additional connector thereby electrically connecting the data storage device to the electronic device.

* * * * *